Jan. 27, 1970  W. T. LAWRENCE  3,492,461
APPARATUS FOR THE PROTECTION OF STRUCTURES EXPOSED
TO HEAT STORAGE COMPOSITIONS
Filed Dec. 28, 1967  5 Sheets-Sheet 1

Jan. 27, 1970   W. T. LAWRENCE   3,492,461
APPARATUS FOR THE PROTECTION OF STRUCTURES EXPOSED
TO HEAT STORAGE COMPOSITIONS
Filed Dec. 28, 1967   5 Sheets-Sheet 4

INVENTOR
WILLIS THOMPSON LAWRENCE
BY Richard K. Jackson
ATTORNEY

United States Patent Office 3,492,461
Patented Jan. 27, 1970

3,492,461
APPARATUS FOR THE PROTECTION OF STRUCTURES EXPOSED TO HEAT STORAGE COMPOSITIONS
Willis Thompson Lawrence, Winchester, Mass., assignor, by mesne assignments, to Hooker Chemical Corporation, Niagara Falls, N.Y., a corporation of New York
Filed Dec. 28, 1967, Ser. No. 694,323
Int. Cl. H05b 1/00, 3/02; F24h 7/00
U.S. Cl. 219—325                                    12 Claims

ABSTRACT OF THE DISCLOSURE

The useful life of a heat storage apparatus which employs a substantially anhydrous alkali metal hydroxide heat storage composition is extended by protecting and confining all internal structures to the approximate region of their original position by shielding from adverse forces with rigid structural members, bundling several structures to produce a combined structure of increased strength or providing a molten sheath of heat storage material around the internal structure. The heating of the heat storage material is by electrical resistance heaters.

Brief summary of the invention

In the operation of heat storage equipment which operates on the heat of fusion concept characteristic of alkali metal hydroxide compositions, the heat storage medium passes from a solid state to the liquid state in a complete operating cycle. Alkali metal hydroxide compositions, when used as heat storage material, cause severe stress in the internal structures of a heat storage vessel because of their extremely high adhesive strength to metals upon solidification. However, alkali metal hydroxide compositions remain very desirable heat storage media because of their high heat capacity. Hence, the development of apparatus capable of housing alkali metal hydroxide compositions for practical periods of time while remaining functionally operational is essential to the utilization of the desired heat storage materials.

Due to the expansion and contraction of the heat storage medium and because of the adhesion of the alkali metal hydroxide composition to the internal structures within the heat storage tank, the structures may become distorted and misshapen to the extent that they no longer function optimally. To prevent this distortion, all components of the apparatus which contact the heat storage medium must be shielded from the forces of expansion and contraction attending the solidification and liquefaction of an alkali meal hydroxide composition.

Alkali metal hydroxide compositions which contain a major proportion of an alkali metal hydroxide are the preferred heat storage materials. Specifically, the alkali metal hydroxide composition may be one containing a major amount of sodium hydroxide, a minor amount of sodium nitrate and a minor amount of a corrosion inhibitor.

The problem of distortion of structures in contact with alkali metal hydroxide compositions within a heat storage container appears to be a unique problem attending the use of alkali metal hydroxide compositions. Keene, in U.S. 1,555,292, issued Sept. 29, 1925, discloses an electric furnace containing as the heating element, a resistor wire wound in the form of a flat helix, the end of each turn in the heating element is supported by a "spaced pocket" in a refractory member fitted to a metal frame. "Any movement of the end portions of each turn of the resistor member proper is prevented in both a lateral and longitudinal direction relative to the heating unit . . . ." This reference does not disclose the nature of the material to be heated nor does it discuss any specific problem necessitating protection of the heating element other than to make the distance between pockets in the refractory material sufficiently large to resist strains during assembly, disassembly and during operation.

Plumb, in U.S. 1,790,555, issued Jan. 27, 1931, discloses the use of a solid heat storage material through which a heat exchange coil horizontally disposed is partially embedded. No mention of any problem of coil distortion is made by the patentee, even though the coil is not protected. The coil is in fact a reverse spring wound helix.

It is an object of this invention to prevent the distortion of structures within the alkali metal hydroxide composition used for heat storage media in a heat storage vessel.

It is a further object of this invention to avoid the stresses placed upon the heating elements and conduit for heat transfer material which are exposed to alkali metal hydroxide heat storage material in a heat storage vessel.

It is a further object of this invention to provide shielding members for the internal structures of a heat storage apparatus.

In accordance with this invention, it has been discovered that the creep of internal structures within an alkali metal hydroxide heat storage composition, whether from exposure to high temperature or the stress caused by the expansion and contraction of the heat storage material during solidification and melting may be avoided by shielding the internal structures. The concept of protecting internal structures embraces broadly containment of the structure to prevent lateral, horizontal or any oblique movement of the structure from the original configuration and disposition of the structure within the heat storage tank. The internal structures need not be attached to rigid members, but must be contained within a relatively small distance from their original position. Therefore, the protection of the internal structures of heat storage tanks may embrace containment, direct shielding from adverse forces in the form of rigid members which provide a bearing surface at a point for direct attachment, or avoidance of the direct contact of solid heat storage medium with the internal structure as by providing through heating means, a sheath of molten storage material around all surfaces of the internal structure which contacts the heat storage material.

For example, the unheated lengths of several heating elements in the heat storage medium of a heat storage tank may be protected by tying them together to provide extra rigidity or by attaching them to a rigid member within the heat storage medium or by confining them between rigid members within the heat storage medium, or by coupling them in such manner that no unheated region of the alkali metal hydroxide composition contacts the heater.

Of course, if the heating elements are so designed that they have no unheated sections below the surface of the heat storage material, no force will be exerted upon them because they will always be surrounded with a sheath of molten material. This same result may be effected by combining another heater with the first heating element to provide heat near any section of the first heater which is not heated thereby maintaining a sheath of molten material around both heating elements. In the absence of bundled heater elements or heating elements which have no unheated sections exposed to the alkali metal hydroxide composition, it is necessary to contain or shield the heater element from excessive forces resulting from heating and cooling of the storage material. In like manner a distinct heater may be disposed along the path of the heat transfer conduit to maintain a molten sheath of material in all areas of contact with the storage material.

In one preferred embodiment of this invention, a heater is run along the length of the heat transfer conduit. In operation, the heater maintains a sheath of molten material around the heat transfer conduit thereby protecting it from the forces of expansion and contraction.

In another preferred embodiment of this invention, applicable to the protection of the heat transfer conduit when it is provided with a flat spiral in the heat storage material, immediately below the flat spiral of the conduit a heater is mounted which is bent to provide a high heat density in the region of the flat spiral.

In both of these modifications of the invention, an additional advantage is provided. That is, heat from the heat storage material may be withdrawn at a rate close to the input rate from the electric heater during periods when the heat storage material is discharged. This rapid delivery of heat is important during periods when the heat stored in the alkali metal hydroxide composition has reached a level too low for practical heating efficiency.

Detailed description of the invention

The invention may best be understood by consideration of the various embodiments presented in the accompanying drawings.

Figure 1:
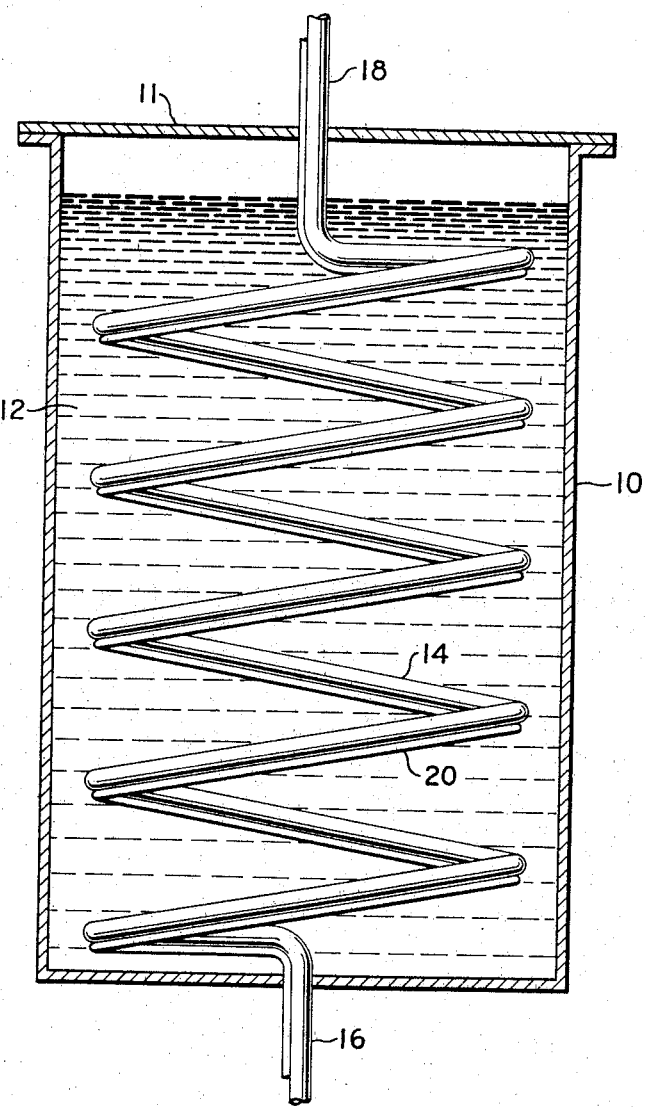
FIG. 1 represents a sectional view of the configuration of a heat transfer conduit and a protective heater therefor, housed within a heat storage vessel.

Specifically, with reference to FIG. 1, heat transfer fluid enters the heat storage vessel 10 housing a heat storage composition 12 via conduit 14 near the bottom of the vessel at inlet 16. The heat transfer fluid passes through conduit 14 to outlet 18. Immersion heater 20 is placed along heat transfer conduit 14 to provide heat and a molten sheath around heat transfer conduit 14 wherever contact with heat storage composition 12 is made, thereby preventing distortion of the configuration of heat transfer conduit 14.

Figure 2:
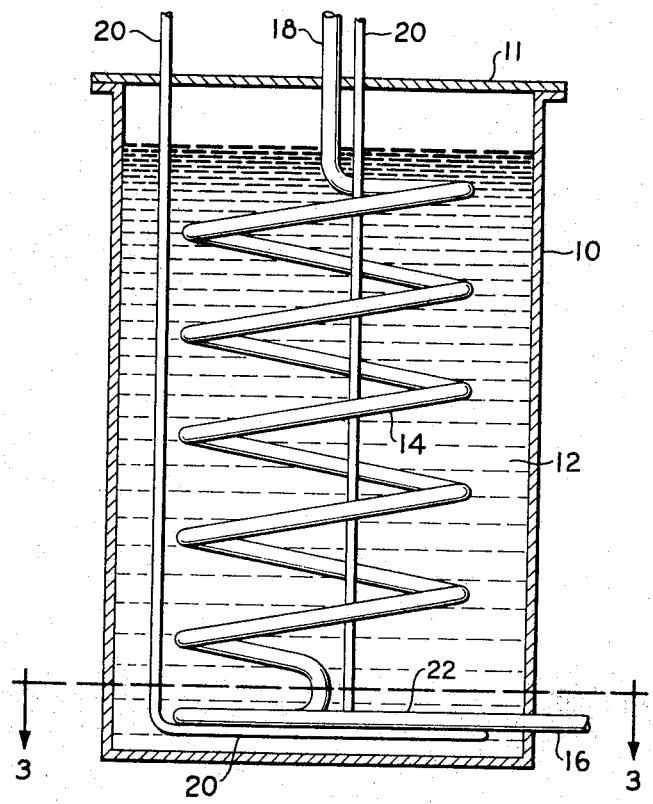
FIG. 2 represents another protective disposition of a heat transfer conduit as a flat spiral with a heater directly below.
Figure 3:
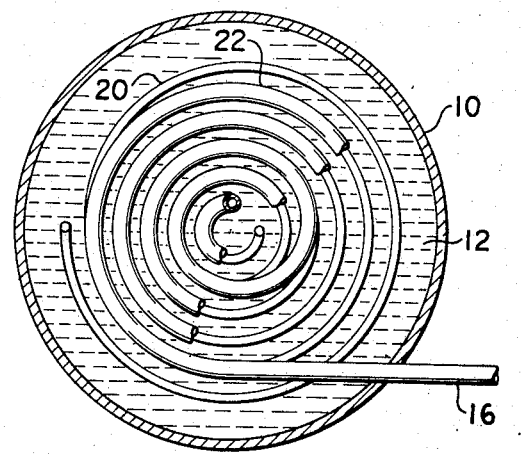
FIG. 3 represents a top view of FIG. 2 taken along plane 3—3.

In FIGS. 2 and 3, another variation of heat transfer conduit protection is illustrated. Immersion heater 20 is placed directly below a broad flattened spiral 22 of heat transfer conduit 14 within heat storage material 12 thereby providing a molten sheath of heat storage material 12 around the flattened spiral 22 to prevent distortion of 22 and provide for rapid heat production during any period when the heat stored in heat storage material 12 is below the level desired.

Figure 4:
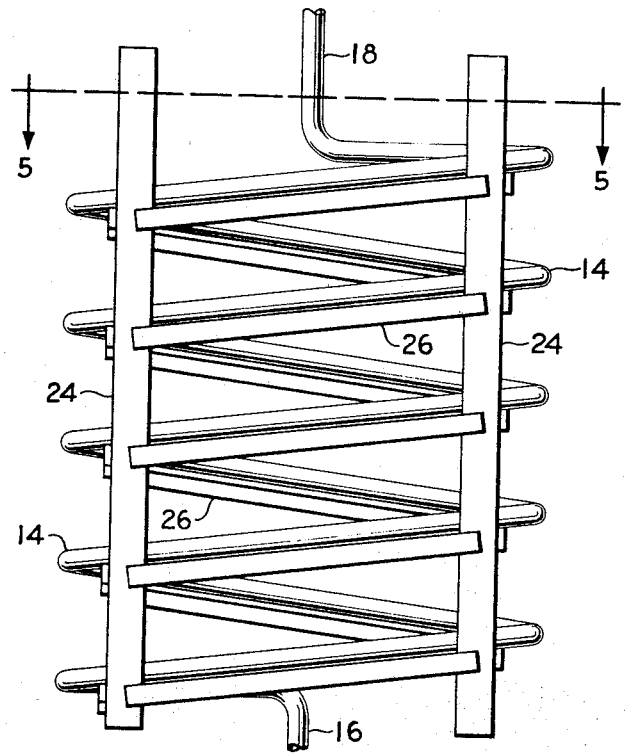
FIG. 4 represents a sectional view of a heat transfer conduit assembly.
Figure 5:
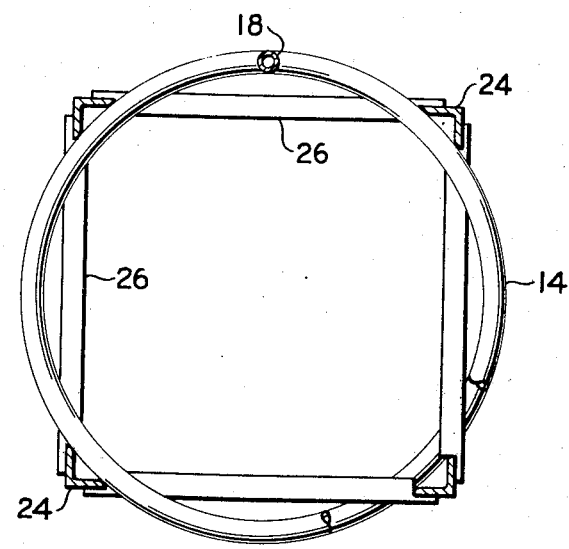
FIG. 5 represents a top view of FIG. 4 taken along plane 5—5.

FIGS. 4 and 5 illustate a protective device comprising an upright angle iron frame 24 upon which cross members 26 are placed which provide an angle from the horizontal equal to the descending rate of the heat transfer coil 14. The vertically placed frame 24 prevents distortion of the coil 14 along the horizontal axis. The cross members 26 arrest downward travel of the conduit 14. Thus, the cross members 26 are disposed to provide a resting platform or shelf upon which conduit 14 will bear when an adhesive force is exerted upon the conduit during expansion or contraction of heat storage composition 12. Cross members 26 may also be provided with extension members which protrude upwardly in the region defined by the heat transfer conduit where 14 extends beyond frame 24. The vertical frame 24 as depicted in FIGS. 4 and 5 may be hung from the top 11 of the heat storage vessel 10 shown in FIGS. 1 and 2, or disposed within heat storage composition 12 in any manner.

Figure 6:
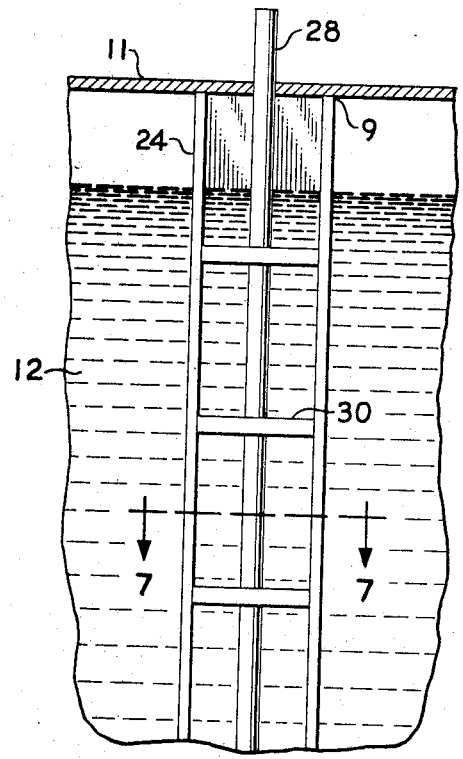
FIG. 6 represents a sectional view of a heating element and protective assembly therefor.
Figure 7:
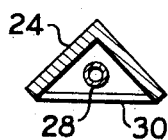
FIG. 7 represents a top view of FIG. 6 taken along plane 7—7.

FIGS. 6 and 7 illustrate an apparatus which will protect any unheated portion of a heating element 28 which is exposed to the forces of expansion and contraction of heat storage material 12. A piece of angular metal 24, attached to the top 11 of the heat storage vessel at 9, with straps of metal 30 attached across its open face will contain heater element 28 and prevent distortion and migration from the optimum heat situs. This concept is, of course, applicable to the heating element depicted in FIGS. 2 and 3 which may be of the type which provide heat only in the region of the flattened spiral of heat transfer conduit. In another application, the heater leg 28 could be inserted in an angle iron which provides the vertical frame 24 as depicted in FIGURE 4. The unheated portion of the heater leg 28 would thereby be contained by the vertical frame 24 and the heat transfer conduit 14.

Figure 8:
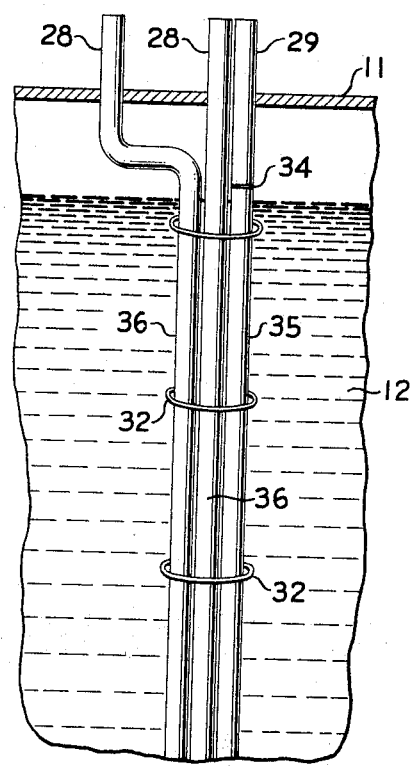
FIG. 8 represents a diagrammatic representation of bundled heater elements.

FIGURE 8 illustrates another protective device for the unheated portion 36 of a heater 28 by bundling heater element 28 with a heater element 29 so as to provide a heated portion 35 of heater 29 adjacent to the unheated portion 36 of heater 28. The head portion of 29 extends from 34 down. Thusly, all parts of heaters exposed to the heat storage material 12 will be provided with a molten sheath of material to prevent distortion during expansion and contraction. These bundled heaters may be held within operable proximity to the adjacent heater with a binding 32 in the form of wire or other means. The heated and unheated portions 35 and 36, respectively, may be legs of the same heater.

In the same manner as is depicted in FIGURE 8, several unheated electrical resistance heater legs may be bundled together to provide a composite structure with more strength than that of the sum of the individual legs. The bundled heater legs may be held together with a binding 32 in the form of wire or other means whether or not the section of heater element 29 as shown in FIGURE 8 as heated portion 35 is heated. In the first instance, heater element 28 is protected from distortion by a molten sheath of heat storage material 12 while in the latter case a mechanical structure support is provided by the hundled heater legs.

Figure 9:
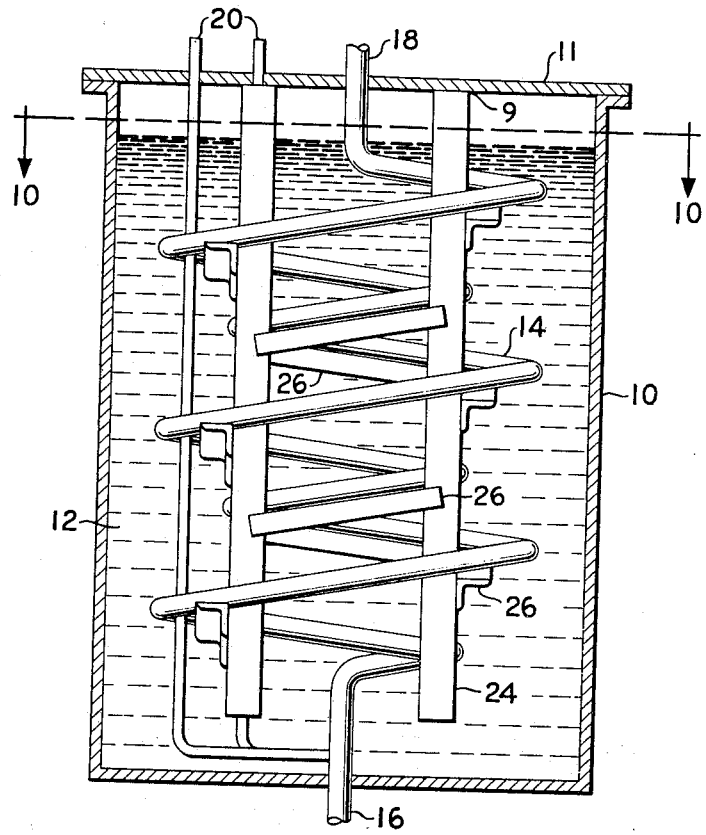
FIG. 9 represents a sectional view of a heat storage vessel in which a heat transfer conduit presents alternate turnings of consistently varied diameter contained by frame members hung from the top of the vessel and in which the heating element is contained between the heat transfer conduit and the frame member.
Figure 10:
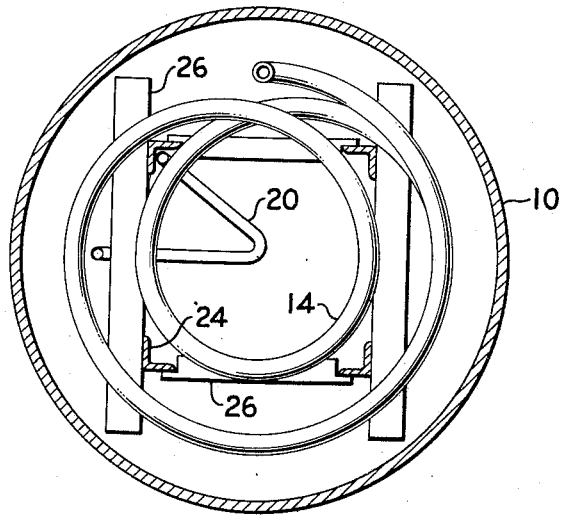
FIG. 10 represents a top view of FIG. 9 taken along plane 10—10.

FIGURES 9 and 10 illustrate a heat storage vessel 10 partially filled with an alkali metal hydroxide heat storage composition 12, in which heat transfer conduit 14 extends from an inlet 16 to an outlet 18 via alternate turnings of consistently varied diameter. Heat transfer conduit 14 is contained by vertically placed frame members 24 to which cross members 26 are attached at an angle from the horizontal corresponding to the descending angle of the heat transfer conduit 14. The vertical frame members 24 are attached to the top 11 of heat storage vessel 10 by any suitable means such as welding or bolting to provide a support means hung from the top of the heat storage apparatus for easy removal from the vessel 10. A heating element 20 is disposed within angle via frame member 24 in such manner as to restrict its position between the vertical frame member and the heat transfer conduit 14. Heater element 20 is provided with any configuration in the lower region of the heat storage material 12 as may be best seen from FIGURE 10 as a triangular configuration. Heater element 20 extends from the lower region of the heat storage material 12 upwardly between the frame cross members 26 and the outer loops of the heat transfer conduit 14 in such manner as to provide containment on a horizontal or oblique plane.

Having disclosed the invention, it is obvious to those of average skill in the art that various modifications of my invention may be made which do not depart from the spirit and true scope of this contribution.

What is claimed is:

1. A heat storage apparatus comprising a vessel containing an alkali metal hydroxide heat storage composition, conduit means for heat transfer media and heating means, said conduit means and heating means disposed in said vessel being protected from movement by means which limit vertical and horizontal movement of said conduit means and heating means during solidification and melting of said heat storage composition.

2. The apparatus of claim 1 in which said conduit means are provided with heating means which trace the route of said conduit through said vessel, said heating means being adapted to provide sufficient heat to melt a sheath of heat storage material around said conduit.

3. The apparatus of claim 2 in which said heating means is attached to said conduit.

4. The apparatus of claim 2 in which said heating means is bound to said conduit.

5. The apparatus of claim 1 in which said conduit forms a flat spiral and heating means are placed in such proximity to said flat spiral that said conduit is protected by a sheath of liquid heat storage material.

6. The apparatus of claim 1 in which said conduit is provided with alternate turnings of consistently varied diameter contained by vertically placed frame members to which cross members are attached at an angle from the horizontal corresponding to the descending angle of the helically displaced conduit, said frame members and cross members being so located as to provide substantial restriction from movement by said conduit.

7. The apparatus of claim 6 in which the frame members are hung from the top of the heat storage apparatus.

8. The apparatus of claim 6 in which said heating means are contained at least a portion of their length between the descending helical conduit and the vertically placed frame members.

9. The apparatus of claim 1 in which said heating means comprise electrical resistance heaters which provide heat to said heat storage composition through a portion of their exposed surface, and said protective means protect unheated portions of said heater.

10. The apparatus of claim 9 in which said electrical resistance heaters extend through a channel which is an angular metallic member with metallic straps attached across the open face.

11. The apparatus of claim 9 in which said protective means for the electrical resistance heaters is provided by bundled heaters in such manner that heat is provided by a heater in the region where heat is not provided by another heater so that the unheated portion of a heater is protected by a molten sheath of heat storage material melted by a bundled heater.

12. The apparatus of claim 9 in which said protective means for the electrical resistance heaters is provided by bundled heaters in such manner that several unheated legs are bound together to provide a composite structure with more strength than that of the sum of the individual legs.

References Cited

UNITED STATES PATENTS

| | | | |
|---|---|---|---|
| 2,687,626 | 8/1954 | Bartlowe | 165—164 X |
| 2,911,513 | 11/1959 | MacCracker | 122—32 X |
| 3,062,510 | 11/1962 | Percival | 165—104 X |
| 3,163,209 | 12/1964 | Shinn | 165—163 X |
| 3,356,834 | 12/1967 | Mekjean | 126—400 X |

FOREIGN PATENTS 157,156  10/1939  Austria.

ROBERT A. O'LEARY, Primary Examiner

A. W. DAVIS, Assistant Examiner

U.S. Cl. X.R.

126—400; 165—104, 134; 219—302, 365, 378, 530, 540